Nov. 4, 1952  F. GROSS  2,616,742

DEVICE FOR PICKING FRUIT AND THE LIKE

Filed March 4, 1952

INVENTOR.
Frank Gross
BY
Merchant & Merchant
ATTORNEYS

Patented Nov. 4, 1952

2,616,742

UNITED STATES PATENT OFFICE 2,616,742

DEVICE FOR PICKING FRUIT AND THE LIKE

Frank Gross, Hutchinson, Minn.

Application March 4, 1952, Serial No. 274,722

4 Claims. (Cl. 294—19)

My invention relates to devices for picking fruit and the like and is in the nature of an improvement upon the structure of my Pending United States application S. N. 118,569, filed September 29, 1949, and entitled "Pick-up Device."

The device of my above-identified pending application is particularly adaptable (insofar as the pivoted jaws 18 are concerned) to the picking up of potatoes, apples, stones and the like from the ground, while permitting extraneous matter such as sand and dirt to escape therefrom. It is the primary object of my present invention to convert said structure into a device for successfully picking apples, oranges, grapefruit, and even smaller objects such as cherries, plums, and nuts, while the same are still on the trees.

Another object of my invention is the provision of a picking device in which the cooperating picking jaws will open under the action of gravity when the same is positioned in a fruit-picking position with the jaws in the air.

A further object of my invention is the provision of inexpensive and fool-proof means for varying the gravitational bias of the picking jaws.

A still further object of my invention is the provision of a device of the type above described, which is inexpensive to produce, easy to operate, rugged in construction, and durable in use.

The above and still further objects of my invention will become apparent from the following detailed specification, appended claims, and attached drawings.

Referring to the drawings, wherein like characters indicate like parts throughout the several views.

Figure 1:
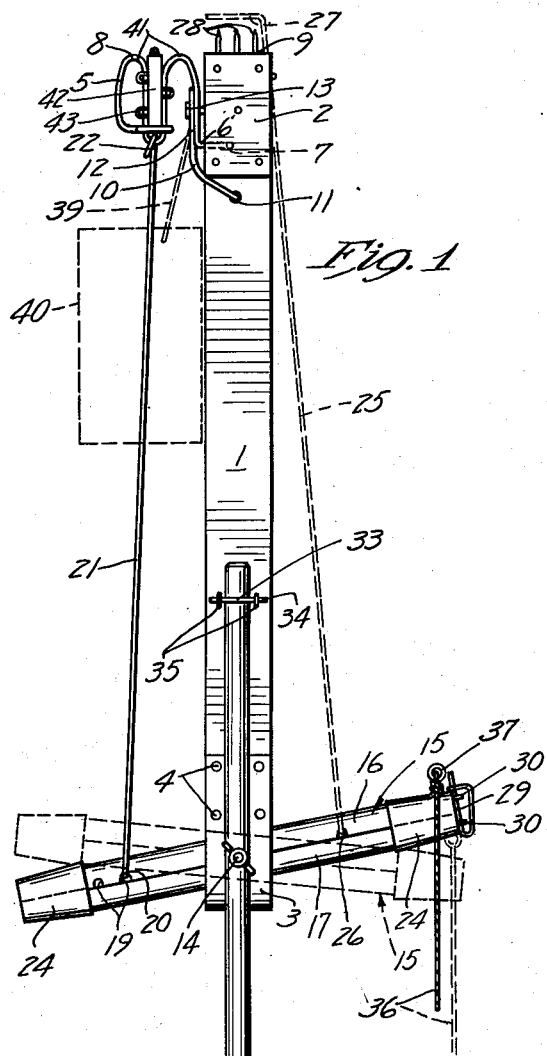
Fig. 1 is a view in side elevation of my novel structure.

Referring with greater particularity to the drawings, the numeral 1 indicates an elongated shank, the outer or picking end of which is provided with a head 2. On the opposite end of the shank 1 is bracket means 3, preferably and as shown in the nature of a U-shaped strap secured to the opposite sides of the shank 1 by means of rivets or the like 4. A pair of cooperating jaws 5 and 6 respectively are preferably formed from relatively rigid steel wire or the like. Each of the jaws 5 and 6 is formed, as indicated in my above-identified copending application, with an integrally-formed trunnion 6' receivable in apertures 7 in the shank. Said jaws operate in laterally-spaced relation to the head 2 with their extreme outer ends 8 being in substantially the same plane as the extreme outer end 9 of the shank 1.

To retain the trunnions 6' of the jaws 5 and 6 within the apertures 7, I provide locking means in the form of a U-shaped spring clip 10, the closed end 11 of which extends loosely through an aperture in the shank 1 with the opposite sides 12 overlying one each of the jaws 5 and 6 closely adjacent the apertures 7. Said sides 12 are retained in locking engagement with the jaws 5 and 6 by means of a pair of spaced headed pins 13 against which they exert yielding bias. It should be obvious that, when it is desired to remove the jaws 5 and 6 from the shank 1, it is but necessary to compress the sides 12 of the locking member 10 sufficiently to enable same to be swung outwardly from the headed pins 13, at which point the trunnions of the jaws 5 and 6 may be removed from the apertures 7.

Extending transversely through the U-shaped strap 3 longitudinally-outwardly of the shank 1 is a pivot pin 14 on which is mounted for rocking movements lever means 15 made up of a pair of slidably-matted lever elements 16 and 17. One of the level elements 16 or 17 (preferably and shown the lever element 16) is transversely notched as at 18 at its longitudinal center to loosely receive the pivot pin 14, see particularly Fig. 4. Likewise, one of the elements 16 or 17, again preferably element 16, is provided with longitudinally - spaced transversely - extended notches 19, the purpose of which, as shown in Figs. 1 and 2, is to loosely receive the transverse portion 20 of a U-shaped link 21, the free ends of which are connected one each with one of the jaws 5 and 6, as indicated by the numerals 22 and 23 respectively.

Figure 4:
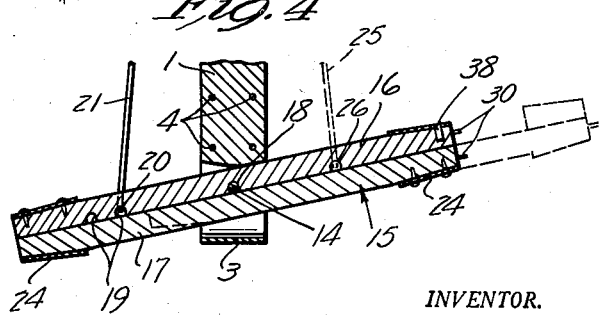
Fig. 4 is a view in vertical section, taken substantially on the line 4—4 of Fig. 2.

As shown particularly in Figs. 1 and 4, each of the elements 16 and 17, at opposite ends, is provided with an annular sleeve or ferrule 24. Preferably and as shown, the ferrules 24 taper outwardly so as to snugly receive the tapered outer ends of the other of said elements 16 and 17. As shown by the dotted lines in Fig. 4, the element 17 may be slidably moved longitudinally so as to disassemble the lever means 15, the primary purpose of which is to allow adjustment of the transverse portion 20 of the link 21 with respect to the pivot pin 14. It should also be obvious that, when the element 17 is moved entirely from sliding engagement with the element 16, the U-shaped stripper element 25, indicated by dotted lines, may be removed from the notch 26. It might here be stated that the element 25, the integrally-formed stripper bars 27 and cooperating pick-up tines 28, all of which are clearly described in my above-identified copending application, form no part of the present invention and hence will not be described in detail herein. When the elements 16 and 17 are in assembled relationship, as shown by full lines in Figs. 1–4 inclusive, they may be securely locked against longitudinal sliding movement by means of a locking pin 29, preferably and as shown of the safety pin variety, which passes through aligned openings in apertured members 30, one each in adjacent ends of the members 16 and 17.

For the purpose of providing longitudinal extensibility to the shank 1, I provide a shank extension member 31, which is centrally apertured, as at 32, to receive the headed pin 14. An anchoring element on the shank 1 maintains the shank members 1 and 31 in vertical alignment. This anchoring element is made up of a U-shaped member 33 formed from steel wire or the like and having its outwardly-bent opposite ends 34 loosely received within transversely-speed apertured members 35. For the purpose of imparting rocking action to the lever 15 and consequently opening and closing movements to the jaws 5 and 6, I preferably provide a cord or the like 36 which is secured to an eye-equipped pin 37 which is adapted to be snugly received within an opening 38 adjacent the outer end of the lever-forming element 16 opposite the openings 19. When it is desired to impart sliding movements to the members 16 and 17 for the purpose of adjusting the pivotal connection of the portion 20 with the notches 19, the pin 37 must obviously be removed from the opening 38.

Figure 2:
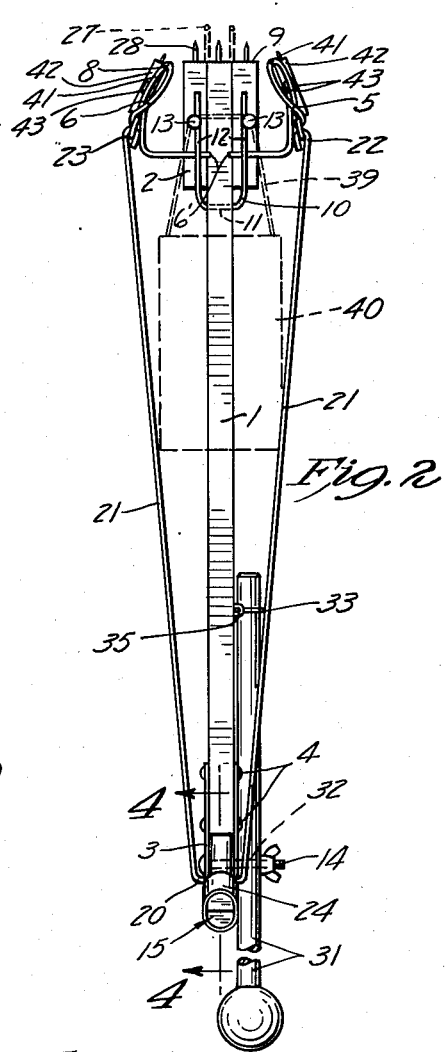
Fig. 2 is a view in front elevation thereof.
Figure 3:
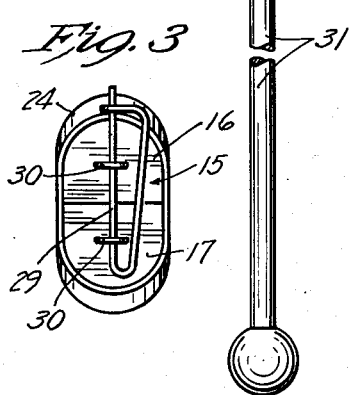
Fig. 3 is an enlarged fragmentary view in end elevation of the lever means and locking means therefor.

As shown, particularly by reference to Fig. 2, the headed pins 13 provide a simple and efficient means for receiving the bail 39 of a conventional pail 40, so that the fruit or the like being picked from the tree by the jaws 5 and 6 may, under the action of gravity, be deposited therein. In this manner, undue bruising of the fruit is prevented.

As shown, particularly in Fig. 1, the wire from which the jaws 6 are formed is bent into serpentine loops to provide spaced pick-up fingers 41, whereby to permit dropping therethrough of sand, gravel, dirt, and other particles not intended to be picked up when apples, potatoes and the like are picked up. However, when my novel structure is used to pick fruit from trees, particularly small fruit such as plums and cherries, it is desirable to close the opening between the fingers 41. This I accomplish by means of cleats 42, projecting from the side edges of which are pairs of laterally-spaced gripping fingers 43 adapted to frictionally engage the wire from which the fingers 41 are formed (see Fig. 2).

In operation, when my device is positioned, as in Figs. 1 and 2, the jaws 6 fall toward their open position under the action of gravity, thereby positioning the lever 15 with the operating cord 36 in the elevated full line position. When it is desired to pick a given piece of fruit or the like, the cord 36 is pulled downwardly, whereby to position the lever 15 in the dotted line position of Fig. 1. The open position of the jaws is again assumed under the action of gravity by releasing the cord 26. To increase the speed of opening of the jaws 5 and 6, the link 21 may be moved, whereby the transverse portion 20 thereof is positioned in the outermost notch 19. Also the U-shaped stripper element 25 may be removed from the notch 26, whereby to further unbalance the jaws 5 and 6.

While I have described a preferred embodiment of my invention, it should be obvious that the same is capable of modification within the scope and spirit of the appended claims.

What I claim is:

1. In a device of the class described, an elongated shank, a head on the outer end of the shank, a pair of cooperating jaw elements journalled to said head in spaced relation for pivotal movements to and from each other in laterally-offset relation to said head, bracket means on the other end of said shank, a pivot pin extending transversely through said bracket means longitudinally outwardly of said other end of the shank, lever means centrally pivotally mounted on said pivot pin, and a U-shaped link pivotally secured at its closed end to said lever means in laterally offset relation to the upper end portion of the shank and on the same side thereof as said jaws, the free ends of said link being pivotally connected one each to one of said jaws, said lever means comprising two longitudinally slidable mating lever elements, one of said elements having a central notch for the reception of said pivot pin, one of said elements having longitudinally-spaced notches intermediate its center and one of its ends for selectively receiving the closed end portion of said link, sleeve means carried by each of said lever elements limiting relative longitudinal sliding movements of one thereof with respect to the other thereof, and means for positively locking adjacent ends of said lever elements against relative longitudinal movements in the opposite direction.

2. The structure defined in claim 1 in which said locking means comprises a pair of alignable apertured members one each on one of said lever elements, and a locking pin receivable within the apertures of said members.

3. The structure defined in claim 1 in further combination with a shank extension member having an aperture intermediate its ends into which said pivot pin is received, an anchoring element on said shank longitudinally inwardly-spaced from said other end thereof and engageable with one extreme end of said shank extension member, and an elongated lever-operating member carried by the end of said lever means opposite the pivotal connection therewith of said link.

4. The structure defined in claim 1 in which said jaws are formed from resilient steel wire or the like having integrally-formed trunnions receivable in laterally-spaced recesses in said head and in further combination with means for releasably locking said jaws to said head, said means comprising a U-shaped spring clip, said spring clip being mounted for swinging movements on said head on an axis transversely of said trunnions and longitudinally-inwardly therefrom, and a pair of headed lock pins on said head, said lock pins being spaced apart a distance greater than the recesses receiving said trunnions and being spaced longitudinally-outwardly from said recesses whereby the arms of said spring clip will overlie one each of said jaws adjacent said trunnions when the free ends thereof are in locking engagement with said lock pins.

FRANK GROSS.

No references cited.